United States Patent [19]

Lanan

[11] Patent Number: 5,403,121

[45] Date of Patent: Apr. 4, 1995

[54] SUBSEA PIPELINE EXPANSION BENDS

[75] Inventor: Glenn A. Lanan, Houston, Tex.

[73] Assignee: Shell Oil Company, Houston, Tex.

[21] Appl. No.: 797,670

[22] Filed: Nov. 25, 1991

[51] Int. Cl.[6] .......................... F16L 51/04; F16L 9/02; F16L 1/12

[52] U.S. Cl. .................................. 405/166; 405/158; 138/118

[58] Field of Search ............... 405/154, 156, 158–160, 405/166, 167, 168.1, 168.2, 169, 170; 138/118

[56] References Cited

U.S. PATENT DOCUMENTS

| | | |
|---|---|---|
| 2,648,201 | 8/1953 | Marancik et al. |
| 3,267,681 | 8/1966 | Maloney ............................. 405/154 |
| 3,461,916 | 12/1966 | Ledgerwood ....................... 138/120 |
| 3,593,820 | 7/1971 | Wright ................................ 181/70 |
| 3,788,083 | 1/1974 | Lundgren ........................... 405/154 |
| 3,847,184 | 11/1974 | God .................................... 138/120 |
| 4,075,861 | 2/1978 | Thyberger et al. ................ 405/154 |
| 4,718,459 | 1/1988 | Adorjan ............................. 138/105 |
| 4,761,846 | 8/1988 | Cox et al. ........................... 14/3 |
| 4,958,958 | 9/1990 | Pedersen ............................ 405/154 |

FOREIGN PATENT DOCUMENTS

| | | |
|---|---|---|
| 37319 | 2/1985 | Japan ................................. 405/154 |
| 877204 | 11/1981 | U.S.S.R. ............................ 405/156 |
| 1161772 | 6/1985 | U.S.S.R. ............................ 405/168.1 |

OTHER PUBLICATIONS

OTC 6332, "Prevention of Upheaval Buckling of Hot Submarine Pipelines by Means of Intermittent Rock Dumping".

OTC 6333, "A Dedicated Finite-Element Model for Analyzing Upheaval Buckling Response of Submarine Pipelines".

OTC 6488, "Upheaval Buckling Failures of Insulated Buried Pipelines: A Case Story".

OTC 6486, "Soil Response for Pipeline Upheaval Buckling Analyses: Full-Scale Laboratory Tests and Modelling".

"New Design Criteria for Upheaval Creep of Buried Sub-sea Pipelines", Paper No. OMAE-88-861.

"Upheaval Creep of Buried Heated Pipelines with Initial Imperfections", Marine Structures 1 (1988) 11–22, P. T. Pedersen & J. J. Jensen.

*Primary Examiner*—Randolph A. Reese
*Assistant Examiner*—John Ricci
*Attorney, Agent, or Firm*—Del S. Christensen

[57] ABSTRACT

This invention relates to a method of accommodating thermal expansion in subsea pipelines and a subsea pipeline. The pipeline is constructed with alternating essentially opposed bends.

18 Claims, 1 Drawing Sheet

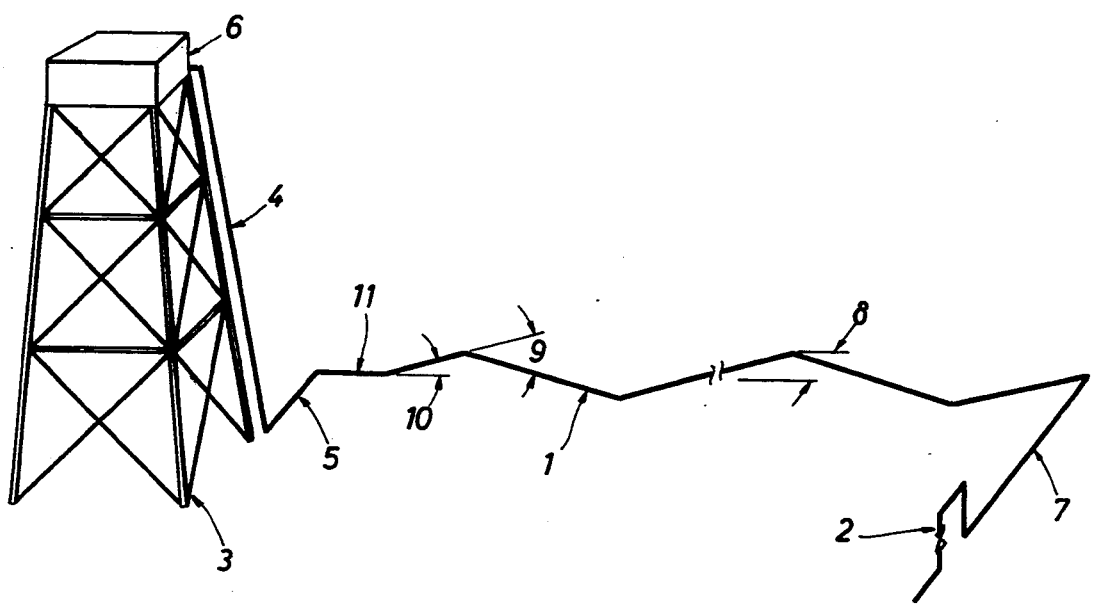

SUBSEA PIPELINE EXPANSION BENDS

FIELD OF THE INVENTION

This invention relates to a method of accommodating thermal and pressure expansion in subsea pipelines.

BACKGROUND OF THE INVENTION

Pipelines operated at elevated temperatures or internal pressures must be designed to accommodate longitudinal expansion. Above-ground pipelines typically incorporate expansion loops of sufficient number and flexibility to accommodate this longitudinal thermal expansion. Buried onshore pipelines often include concrete anchors to control movement at the pipeline ends and bends. Such loops and anchors are not typically utilized in subsea operations because of the method used to lay subsea pipelines. Subsea pipelines are typically fabricated one segment at a time aboard a pipeline-laying vessel. As each segment is added, the vessel moves forward and the pipeline follows a descending path to the seafloor. The suspended pipe span between the vessel stern and the seafloor is typically supported by a stinger attached to the vessel stern and axial tension applied to the pipe. Applying this tension to a pipeline incorporating expansion loops will exceed the elastic stress limits of a typical expansion loop. Typical expansion loops would also not pass easily through the lay-barge pipe tensioning machines or stinger.

Accommodation of thermal expansion is further complicated because subsea pipelines in shallow water are typically trenched into the seafloor to provide stability and to protect from damage by fishing equipment and anchors. Installation of subsea anchors to control longitudinal expansion at the ends of the pipe is often uneconomical. Additionally, restraining expansion results in increased longitudinal compressive forces in the pipe. Similar high compressive forces develop away from the ends on long subsea pipelines due to the frictional restraint provided by the pipe resting on the sea bed. The maximum longitudinal compressive force which a trenched pipeline can sustain without buckling depends on the pipe properties, initial configuration and restraint to movement provided by the surrounding soil. Conventional subsea pipeline installation and trenching methods result in pipe elevation deviations. The pipe forms an overbend when laid over a high point on an otherwise flat trench bottom. If the weight of the pipe plus soil overburden is less than the uplift force caused by compressive pipe forces at the crest of an overbend, the pipe will lift up. This is referred to as an upheaval buckle and can be a cause of pipeline failure. Once an upheaval buckle initiates, pipe forces in from both directions, and the buckle will grow. As the buckle grows, any overburden on the pipe at the point of the buckle is also reduced, resulting in an acceleration in the growth of the buckle. When a method to accommodate thermal growth causes the pipe to maintain compressive forces, the pipe will require routine and detailed inspections to ensure that buckling has not started. Design criteria which rely on maintaining compressive forces within the pipeline are described in OTC paper No. 6335 and by Pedersen, et al. in "Upheaval Creep of Buried Heated Pipelines with Initial Imperfections," *Marine Structures*, Vol. 1, pp. 11-22 (1988). It is preferable to provide a method to accommodate thermal/pressure expansion in which compressive forces are controlled, rather than one which constrains movement and maintains compressive forces within the pipe.

A method which limits compressive forces due to thermal expansion is described in OTC paper No. 6334 by Craig, et al. In this method, a pipeline is laid onto the ocean floor, and then water of a temperature of about the operating temperature is passed through the pipeline. Because the pipeline is not trenched, it will snake laterally to accommodate thermal expansion. The bends which accommodate the thermal expansion are uncontrolled and are assumed to be elastic. The pipeline is then trenched into the seabed while in the expanded mode. This method relies on the friction between the pipeline and soil to maintain the pipe in the expanded configuration. This friction induces tension in the pipeline when the pipeline is cooled and reduces compressive forces when the pipeline is reheated. The pipeline will contract somewhat when cooled, and to the extent this movement is not reversible upon reheating of the pipeline, compressive loads will be placed upon the pipeline. Heating the pipeline after it is laid and while it is being trenched can also be expensive and time consuming. Further, the expansion is not accomplished in a controlled fashion, and could result in a combination of sharp bends and long straight runs. It would be preferable to provide a method to accommodate thermal expansion which does not rely on frictional forces against soil to maintain tension and which accommodates thermal expansion in a controlled manner.

OTC paper No. 6335 summarizes other methods to accommodate thermal expansion in trenched subsea pipelines. Among them are reducing wall thickness of the pipe to reduce compressive forces, backfilling the pipeline trench with rocks, and using a pipe within a casing pipe configuration. Each of these methods are relatively expensive or of questionable effectiveness.

It is therefore an object of the present invention to provide a method of accommodating thermal expansion within a heated subsea pipeline and a subsea pipeline capable of operating at elevated temperatures. It is a further object to provide such a method and pipeline wherein frictional forces against soil are not required to retain tension when the pipeline is not in a heated state. It is another object to provide such a method and pipeline wherein the expansion is accommodated at frequent and relatively uniform intervals along the length of the pipeline.

SUMMARY OF THE INVENTION

These and other objects are accomplished by a method to accommodate thermal expansion within a subsea pipeline capable of operating at elevated temperatures comprising: providing a pipeline with bends in alternating essentially opposed directions, the angles of the bends and the distance between the bends being sufficiently small that the pipeline is not plastically deformed when one end of the pipeline is suspended from the surface of the sea, the number and angles of the bends are sufficiently large to prevent upheaval buckling, and the bend angles and distance between the bends are small enough that the pipeline can be passed through a tensioning machine and stinger of a pipeline-laying vessel; and installing the pipeline on a seafloor.

These and other objects are also accomplished by a subsea pipeline comprising: a plurality of bends in alternating opposing directions, the angles of the bends and the distances between the bends being small enough to permit suspension from the sea surface without resulting in plastic deformation at the bends, the angles of the bends, and distance between the bends small enough that the pipeline may pass through a tensioning machine and a stinger of a pipe-laying vessel, and the number and angles of the bends being sufficient to prevent upheaval buckling.

A subsea pipeline is preferably laid from a pipe-laying barge or ship by welding segments to the end of the pipeline on the deck of the vessel and suspending the pipeline to the seafloor. The bends allow thermal expansion to occur by the pipeline moving laterally only a few inches. Because the bends can be incorporated every 20 to 80 feet along the pipeline, the thermal growth is accommodated uniformly along the length of the pipeline, greatly reducing the risk of initiating an upheaval buckle.

Generally, subsea pipelines are terminated at a riser at a platform. Usually, a dogleg expansion loop is provided at the riser to accommodate a portion of the thermal growth of the pipeline end. The pipeline of this method will not grow as much as a straight pipeline at such an unanchored end, and therefore will not require a dogleg to be as long. Because lower compressive forces are generated, the thermal growth at an unanchored end is less sensitive to frictional forces between the pipeline and soil, which are difficult to predict. Thermal growth at unanchored points is therefore more predictable with the zigzag pipeline of the present invention.

BRIEF DESCRIPTION OF DRAWING

The FIGURE is a schematic drawing of a pipeline according to this invention.

DETAILED DESCRIPTION OF THE INVENTION

The pipeline and the method of accommodating thermal expansion of the present invention provide a buried subsea pipeline wherein the pipeline zigzags along its length to accommodate thermal expansion by relatively uniform and relatively small movements of the bends. This limits compressive forces within the pipeline. The allowable compressive forces dictate the minimum number of bends of a particular angle which are required. The maximum bend angles and distance between the bends are limited by the elastic stress limit and section modulus of the bends as the pipeline is suspended between the surface vessel and the seafloor. The maximum angle of the bend, and the maximum distance between bends can be limited by the dimensions of the stinger and pipe handling equipment of the surface vessel. The stinger is a curved guide with rollers extending from the surface vessel's stem to support the pipeline as it starts its decent to the seafloor. Stingers are typically four to six Feet wide in order to handle pipelines of diameters up to about sixty inches. Eccentricity of the pipeline is preferably less than about 1½ feet to ensure that the pipe can easily pass through stingers of many pipe-laying vessels, and more preferably between about 0.5 and 2 feet.

The allowable compressive forces within the pipeline can be calculated using methods described in OTC paper Nos. 6335 or 6487, both presented at the 22nd Annual OTC in Houston, Tex. from May 7 through 10, 1990, or using the method described by Nielsen, et al. in "New Design Criteria for Upheaval Creep of Buried Sub-Sea Pipelines," paper No. OMAE-88-861. Each of these methods require an assumption of a maximum "imperfection" in the initially laid pipeline vertical profile. The "imperfection" is needed as a starting point for compressive forces to cause initiation of an upheaval buckle. Larger imperfections will cause a buckle to initiate at lower compressive forces. OTC paper No. 6335 discloses an estimation of the required total downward load per unit length of pipe, w, to prevent an upheaval buckle from occurring as:

$$w = [1.16 - (4.76)EIw_o/\Delta)^{\frac{1}{2}}/P)]P(\Delta w_o/EI)^{\frac{1}{2}} \tag{1}$$

where $w_o$ = pipe submerged weight per unit length as installed,
E = elastic modulus,
I = moment of inertia,
P = elective axial compressive force in operation, and
$\Delta$ = detect height.

For the pipeline to resist upheaval buckling, the summation of the pipe submerged weight, $w_o$, plus the uplift resistance of any soil overlying the trenched pipe must be greater than the required downward load, w. The uplift resistance of the cover per unit length, q, can be estimated as:

$$q = H\gamma D_o \left(1 + f\frac{H}{D_o}\right) \tag{2}$$

where

H = depth of cover to top of pipe,
$\gamma$ = soil submerged unit weight,
$D_o$ = pipe outside diameter, and
f = uplift coefficient factor (0.1 for loose, cohesionless soil and 0.5 for compact soil).

The onset of upheaval buckling depends on the length of pipeline over which the imperfection occurs. There is a critical length which yields the lowest compressive load that can be balanced by a given deflect and hold-down combination. If the offset occurs over a length longer than the critical length, the backfill can balance a greater compressive load than the one associated with the critical length. If the offset occurs over a length shorter than the critical length, the contribution of the pipe stiffness again yields a greater allowable compressive load. An estimation of this critical length, L, can be obtained from OTC paper No. 6335:

$$L = 5.6\sqrt{\frac{EI}{P}} \tag{3}$$

The compressive load, P, of a restrained, heated pipeline is found by:

$$P = p_iA_i + A_M(E\alpha\Delta T - \nu\sigma_h) - T_o \tag{4}$$

where:

$A_i$ = flow cross sectional area,
$A_M$ = cross sectional area of pipe metal,
$p_i$ = pipe internal pressure,
E = modulus of elasticity,
$\alpha$ = thermal expansion coefficient,
$\Delta T$ = temperature increase over installation,
$\nu$ = Poisson's ratio (0.3 for steel),
$\sigma_h$ = pipe hoop stress due to internal pressure, and
$T_o$ = initial effective tension in pipe after installation.

The level of imperfection to which the pipeline will be designed will therefore depend upon the levelness which can be maintained while laying the pipe. A reasonable elevation deviation is about 20 inches within a critical length of about 60 feet for about a 4 inch to 7 inch diameter pipe. With this level of imperfection, and either the above equations, or those of the cited references, a maximum compressive force within the pipeline can be calculated.

The compressive forces within the zigzagged pipeline and displacements at elevated temperatures can be calculated by methods known in the art. *Marks Standard Handbook for Mechanical Engineers*, 8th Ed., pp. 5–61 to 5–67 (1978), for example, discloses the fundamentals necessary for this calculation. Solutions to this problem are generally iterative due to the interrelationship between movement and residual compressive forces.

A finite element method to determine forces and displacements of systems is discussed by Yuan-Yu Hsieh in *Elementary Theory of Structures*, Sections 17 and 18 (1970). This method may be utilized to determine forces and displacement of the pipeline of this invention.

The eccentricity angle of the zigzag pipe bends must be small enough that the weight of pipeline extending to the seafloor can be supported by the pipe without causing the bends to be deformed plastically. The angle of the bend refers to the angle formed between straight pipe segments. This is shown in FIG. 1 as angle 9. Eccentricity, e, is related both to the angle of the bends and the distance between the bends. Eccentricity, e, is defined as the distance between the centerline of the pipe at the apex of a bend and a line connecting the centers of the pipe half way between the apex of the bend and the apex of the two adjoining bends. The maximum eccentricity for a required tension is given as:

$$e = \frac{I}{TY}\left(\sigma - \frac{T}{A_M}\right) \tag{5}$$

where
I = pipe moment of inertia,
T = pipe installation tension,
Y = radius of gyration,
$\sigma$ = pipe stress at yield, and
$A_M$ = cross-sectional area of metal.

Because the pipe bending moment is a function of the eccentricity and axial tension and the eccentricity is itself a function of the bending moment and pipe bending stiffness, this equation must be solved iteratively for the eccentricity under a tension.

After the zigzag pipeline is fabricated and lowered to the seafloor, it may be placed in a predredged trench or trenched using hydraulic jetting or plowing. The pipeline may be trenched to a depth of two to ten feet below the seafloor to prevent damage by anchors or fishing equipment.

The plane of the zigzag, or alternating essentially opposed bends, may be at any angle to the horizon. The operation will not be impaired if the zigzag pipe is not placed horizontally in the trench. But if the zigzags are vertical, the depth to which the pipe is buried for the above calculations will be the shallowest depth. A deeper trench must therefore be prepared. The zigzags can also vary in orientation to the horizon over the length of the pipeline, but it is preferred that transitions between orientations take place over at least two hundred feet pet 90° rotation in orientation. It is preferred that adjacent bends be essentially in opposed directions.

For cold bends formed in steel pipe, the minimum radius of the bends can be as low as 18 pipe diameters when the pipe is up to 12¾ inches outside diameter. Forged fittings or miter bends can be made sharper, but cold bends are generally preferred due to the lower cost. Subsea pipelines are typically coated with high density polyethylene and/or epoxy coatings. Pipes which are coated may require a bend radius of 20 pipe diameters or more to prevent damage to the coating by the cold bend process. The maximum radius of the bends is limited only by that required to achieve the required eccentricity within the required distance between bends and the increased cost of forming long radius bends. The zigzag pipeline with this maximum bend radius is therefore essentially consecutive S-shaped segments.

Referring to the FIGURE, a zigzag pipeline, 1, is shown, connecting a satellite production well head, 2, with an offshore platform, 3. A pipeline riser, 4, extends to the surface facilities on the platform, 6. A dog leg expansion loop, 5, extends from the bottom of the riser to the end of the pipeline to accommodate some growth of the pipeline due to thermal expansion. The length of this dog leg could be considerably shorter with the zigzag pipeline than with a straight pipeline. The shorter dog leg is primarily due to lower compressive forces being generated within the pipeline. To a lesser extent, the zigzags also provide higher frictional forces which decrease the amount of axial movement of the pipeline.

A dog leg, 7, can also be provided at the production wellhead end of the subsea pipeline.

The pipeline is buried in the seafloor, preferably from the dog leg, 5, to the dog leg, 7, at the other end of the pipeline.

Eccentricity of the pipeline is shown on the FIGURE as dimension 8, where the dimensions are from the center line of the pipe at one bend to the center line at a line connecting the centers of the pipe halfway between the apex of the bend and the apex of the adjoining two bends. The angle of a bend is shown as 9. This angle is the angle formed between the straight pipe segments between adjacent segments. The first and last bends on the zigzag pipeline may for convenience be fabricated at half the standard bend angle, 9. This angle dimension, 10, is the angle formed between the original straight pipe, 11, and the first standard bend.

Of course, the buffed subsea pipeline of the present invention is not limited to the connection of satellite subsea wellheads to production platforms, although this service is a preferred application due to the elevated temperatures frequently encountered in such services. The present invention is also not limited to the conventional pipe laybarge installation method. It may also be used with various towed and pulled subsea pipeline installation methods.

EXAMPLE

A subsea-buried pipeline was designed to transport fluids produced from a wellbore to a central production platform. The pipeline was in about 30 feet water depth, and was trenched to a depth of about 6 feet, measured from the original seabed to the top of the pipe. Four segments having lengths of about 4,000 to about 7,000 feet were designed. The pipeline had a 5.733-inch outer steel diameter, and a 0.741 inch wall thickness. Internal design pressure was 10,600 psig. The design operative temperature was 230° F. and design ambient temperature was 70° F. The pipe was coated with NAP WRAP high temperature corrosion coating.

A maximum vertical deviation of 20 inches was chosen, which corresponds to a critical length of about 60 feet. The maximum allowable compressive load in this pipeline for this deviation to avoid upheaval buckling is about 130,000 lbs. An eccentricity of about 12 inches was chosen with 38-foot pipe segments, with a circular arc of 8 feet between two 15-foot long straight segments. This pipe can be laid with tensions of up to about 150,000 lbs. without plastic deformation, and can easily pass through the stinger, tensioning machines, and deck rollers of many pipe-laying barges and ships. The radius of curvature for the bends represents about 136 pipe diameters.

The maximum compressive force in the zigzag pipe is calculated to be about 102,000 lbs. with no initial tension at ambient temperature. This is well within permissible forces. Maximum forces within a straight pipeline would be about 407,000 lbs., which would be unacceptable due to the risk of upheaval buckling. Maximum lateral displacement of the zigzag pipeline will be about 3 inches, and maximum bending stresses will be about 27,000 psi.

The 38 foot long segments were cold bent onshore. No damage to the coating was found. The segments were welded together using normal procedures, with the bent segments joined with the bends facing alternating directions. The pipeline was laid in a pre-excavated trench.

An S-curve expansion loop configuration with bend radii of 12 feet was considered as an alternative and rejected. A loop would be required about every 1,000 feet to prevent upheaval buckling. The loop would be considerably more expensive, difficult and time consuming to install.

I claim:

1. A method to accommodate thermal expansion within a buried subsea pipeline capable of operating at elevated temperatures comprising: providing a pipeline with bends in alternating essentially opposed directions, the angles of the bends and the distance between the bends being sufficiently small that the pipeline is not plastically deformed when one end of the pipeline is suspended from the surface of the sea, the number and angles of the bends are sufficiently large to prevent upheaval buckling, and the bend angles and distance between the bends are small enough that the pipeline can be passed through a tensioning machine and stinger of a pipeline-laying vessel; and installing the pipeline on a seafloor.

2. The method of claim 1 wherein the pipeline is constructed by welding pipe segments together on a pipe-laying surface vessel, and the pipeline is suspended to the seafloor as it is being laid.

3. The method of claim 2 wherein the segments each contain a bend of a similar angle, and the segments are connected with the bends in alternating essentially opposing directions.

4. The method of claim 3 wherein the segments are each from about 40 to about 80 feet long.

5. The method of claim 1 wherein the pipeline is trenched to a depth of between about 2 and about 10 feet below the seafloor.

6. The method of claim 5 wherein the pipeline is trenched at a depth of about 6 feet below the seafloor.

7. The method of claim 1 wherein the bends have a radius of about 15 pipe diameters or greater.

8. The method of claim 1 wherein the angles of the bends, and the distances between bends, are small enough that the eccentricity of the pipeline is less than about 3 feet.

9. The method of claim 8 wherein the eccentricity is between about 0.5 foot and about 2 feet.

10. A subsea pipeline comprising: a plurality of bends in alternating opposing directions, the angles of the bends and the distances between the bends being small enough to permit suspension from the sea surface without resulting in plastic deformation at the bends, the angles of the bends and distance between the bends small enough that the pipeline may pass through a tensioning machine and a stinger of a pipe-laying vessel, and the number and angles of the bends being sufficient to prevent upheaval buckling.

11. The pipeline of claim 10 wherein the eccentricity of the pipeline is less than about 3 feet.

12. The pipeline of claim 11 wherein the eccentricity of the pipeline is between about 0.5 and about 2 feet.

13. The pipeline of claim 10 wherein the apexes of the alternating bends are separated by from about 20 to about 80 feet.

14. The pipeline of claim 10 wherein the pipeline is trenched in the seafloor at a depth of between about 2 and about 10 feet below the seafloor.

15. The pipeline of claim 14 wherein the pipeline is trenched in the seafloor at a depth of about 6 feet below the seafloor.

16. The pipeline of claim 10 wherein the bends each have a radius greater than about 15 pipe diameters.

17. The pipeline of claim 16 wherein the bends each have a radius of about 20 to about 136 pipe diameters.

18. The pipeline of claim 10 wherein the pipeline can be operated at temperatures of up to about 230° F.

* * * * *